US012561478B2

(12) United States Patent
Bordokan

(10) Patent No.: US 12,561,478 B2
(45) Date of Patent: Feb. 24, 2026

(54) OBFUSCATED STORAGE AND TRANSMISSION OF PERSONAL IDENTIFIABLE INFORMATION

(71) Applicant: MASTERCARD INTERNATIONAL INCORPORATED, Purchase, NY (US)

(72) Inventor: Andre Ming Bordokan, Hollywood, FL (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 114 days.

(21) Appl. No.: 18/195,625

(22) Filed: May 10, 2023

(65) Prior Publication Data

US 2023/0367905 A1 Nov. 16, 2023

Related U.S. Application Data

(60) Provisional application No. 63/340,613, filed on May 11, 2022.

(51) Int. Cl.
*G06F 21/62* (2013.01)

(52) U.S. Cl.
CPC ................................ *G06F 21/6254* (2013.01)

(58) Field of Classification Search
CPC .................................................. G06F 21/6254
See application file for complete search history.

(56) References Cited

U.S. PATENT DOCUMENTS

| | | | | |
|---|---|---|---|---|
| 7,254,557 B1 * | 8/2007 | Gillin | .................... | G06Q 40/02 |
| | | | | 705/40 |
| 7,272,654 B1 * | 9/2007 | Brendel | .................. | G06F 16/13 |
| | | | | 707/999.2 |
| 2003/0023873 A1 * | 1/2003 | Ben-Itzhak | .......... | H04L 63/168 |
| | | | | 726/26 |
| 2014/0281371 A1 * | 9/2014 | Thantry | .............. | G06F 9/30036 |
| | | | | 712/7 |
| 2016/0173445 A1 * | 6/2016 | Mosko | ................ | H04L 61/4552 |
| | | | | 370/392 |
| 2021/0019445 A1 * | 1/2021 | Arnold | ................ | G06F 21/6254 |
| 2021/0350264 A1 * | 11/2021 | Cheng | .................... | G06N 20/00 |
| 2021/0390168 A1 * | 12/2021 | Yarabolu | ................. | G06F 21/51 |

* cited by examiner

*Primary Examiner* — Abu S Sholeman
(74) *Attorney, Agent, or Firm* — Talem IP Law, LLP

(57) ABSTRACT

A method for obfuscated storage and transmission of Personal Identifiable Information (PII) includes applying a collisionable hash algorithm to each name in a dataset of potentially personal identifiable information to generate a set of obfuscated names. Applying the collisionable hash algorithm involves selecting a first group of characters from a name proceeding from left to right; selecting a second group of characters from the name proceeding from right to left; combining the first group of characters and the second group of characters to generate a sequence of characters; and applying a cipher to the sequence of characters to generate an obfuscated name for the set of obfuscated names.

20 Claims, 5 Drawing Sheets

100

102

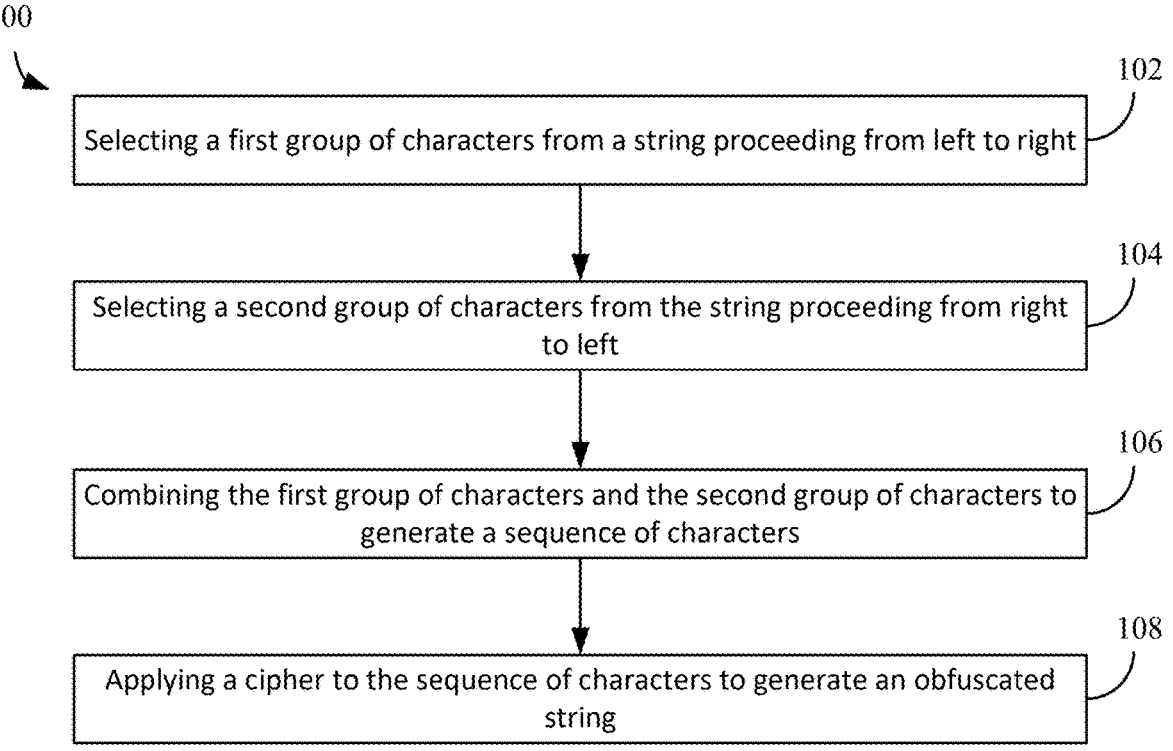

Selecting a first group of characters from a string proceeding from left to right

104

Selecting a second group of characters from the string proceeding from right to left

106

Combining the first group of characters and the second group of characters to generate a sequence of characters

108

Applying a cipher to the sequence of characters to generate an obfuscated string

FIG. 1

Figures 2A, 2B:
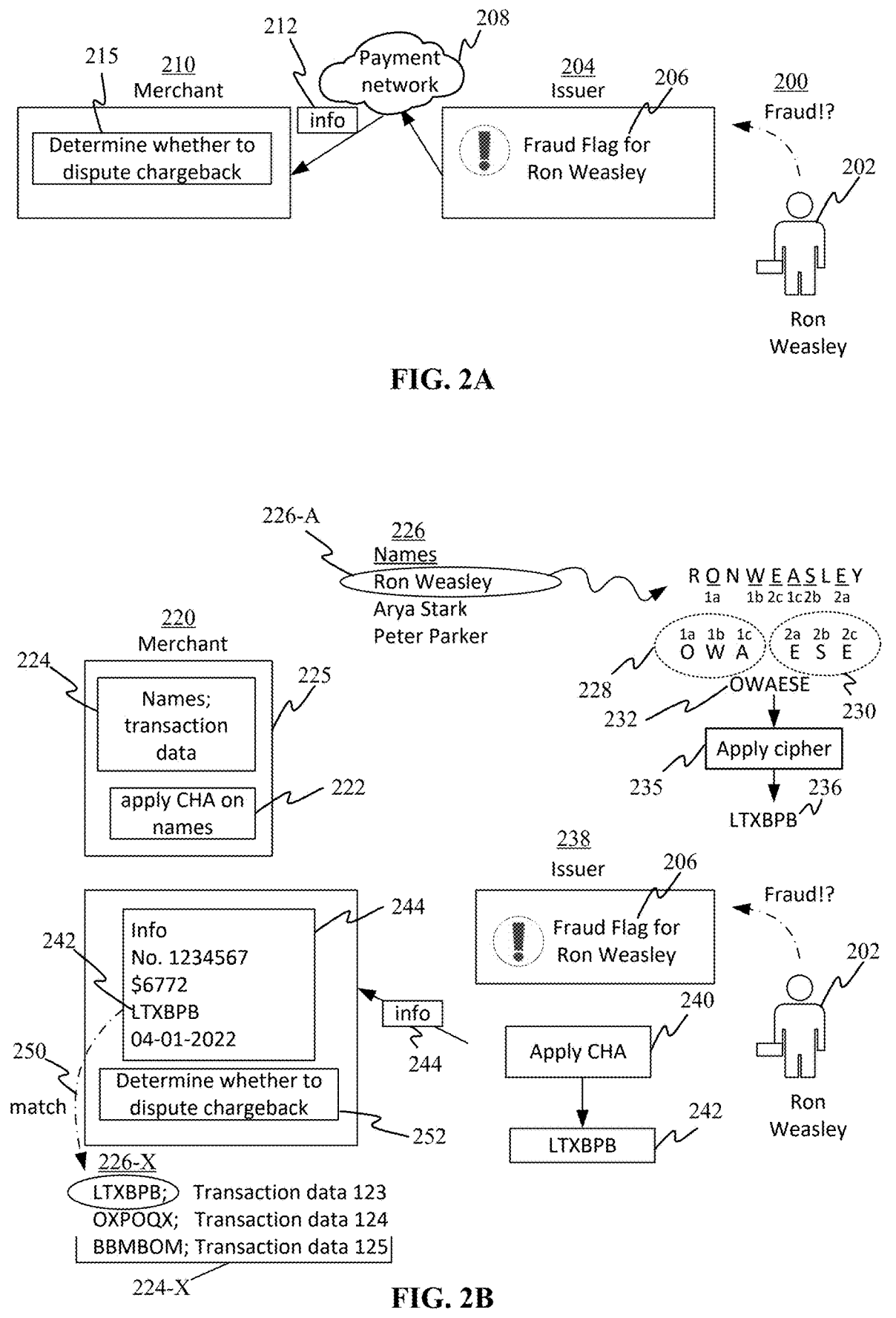

215   210
Merchant 212     208
Payment
network

204
Issuer     206

200
Fraud!?

Determine whether to
dispute chargeback info

Fraud Flag for
Ron Weasley

202

Ron
Weasley

226
Names

Ron Weasley
Arya Stark
Peter Parker

R O N W E A S L E Y
1a    1b 2c 1c2b  2a 1a 1b 1c     2a 2b 2c
O  W  A      E  S  E 228                              230
232        OWAESE

235        Apply cipher

236
LTXBPB

220
Merchant 224     225

Names;
transaction
data apply CHA on
names     222

238
Issuer     206

Fraud!?

Fraud Flag for
Ron Weasley

240

202

Apply CHA

242

Ron
Weasley

244
Info
No. 1234567
$6772
LTXBPB
04-01-2022

242 info     244

250
match

Determine whether to
dispute chargeback     252

226-X
LTXBPB;   Transaction data 123
OXPOQX;   Transaction data 124
BBMBOM; Transaction data 125

224-X

LTXBPB

Applying a collisionable hash algorithm to each name in a dataset of potentially personal identifiable information

320

Receiving a string from a second entity

330

Matching the string to a matching obfuscated name from the set of obfuscated names

```
<code> from caesarcipher import CaesarCipher increase length in the case of very short cardholder names original_len = len(trim(cardholder_name))

while len(trim(cardholder_name))<13: ##trim to remove spaces cardholder_name=cardholder_name+cardholder_name else:

capture total length, the first and last 3 alternate chars total_length = len(cardholder_name)

first3 = cardholder_name[1,3,5]

last3 = cardholder_name[total_length-1, total_length-3, total_length-5] hash6 = concat(first3, last3)

##implements the Caesar cipher on the hash using the original_len as offset caesar_hash6 = CaesarCipher(hash6, original_len)

Return ceasar_hash6

</code>
```

OBFUSCATED STORAGE AND TRANSMISSION OF PERSONAL IDENTIFIABLE INFORMATION

BACKGROUND

Personal Identifiable Information (PII) is considered sensitive information that companies make effort to avoid leaking or otherwise being abused. There are, however, numerous scenarios where being able to provide cardholder name information to certain entities would be beneficial.

For example, currently, the payment networks do not leverage nor send cardholder name information on the payload of the transaction to the issuers and, subsequently, to the merchant when a chargeback happens. A chargeback is a charge that is returned to a payment card after a customer successfully disputes an item on their account statement or transactions report. The payment networks do not send this information to the issuers and merchants because this information is sensitive PII and the payment networks do not want to risk the PII leaking or otherwise abused. Merchants in specific are affected when they receive a chargeback. The payload of a chargeback does not include the cardholder's name; therefore, the merchant cannot run a simple analysis on the claim to decide if they will accept-therefore refunding the transaction—or represent. The usual way merchants deal with this is to wait for the acquirer to send this data, usually several days later. This delay in getting this data can affect the outcome of the decision because the payment networks usually incentivize fast responses for faster resolutions.

BRIEF SUMMARY

Methods and systems for obfuscated storage and transmission of Personal Identifiable Information (PII) are described. A new hash function is presented that can be used for masking PII data in ways that are useful for fraud analysis. Indeed, the resulting hash can be transferred between parties through an unsecured manner to allow for confirmation of an identification. No decoding or unmasking is necessary.

A method for obfuscated storage and transmission of Personal Identifiable Information (PII) includes applying a collisionable hash algorithm to a name. Applying the collisionable hash algorithm involves selecting a first group of characters from the name proceeding from left to right; selecting a second group of characters from the name proceeding from right to left; combining the first group of characters and the second group of characters to generate a sequence of characters; and applying a cipher to the sequence of characters to generate an obfuscated name. The hash algorithm is considered a collisionable hash algorithm because collisions (i.e., the duplication of output values) are intended.

The obfuscated name can be stored safely as the obfuscated name will not easily be decoded. In addition, the obfuscated name can be transmitted over non-secure channels for similar reasons.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 1 illustrates a process flow for applying a collisionable hash algorithm.

FIGS. 2A and 2B illustrate a scenario in which obfuscated storage and transmission of PII is beneficial.

FIG. 4 is an example implementation of the collisionable hash algorithm.

DETAILED DESCRIPTION

Figure 3:
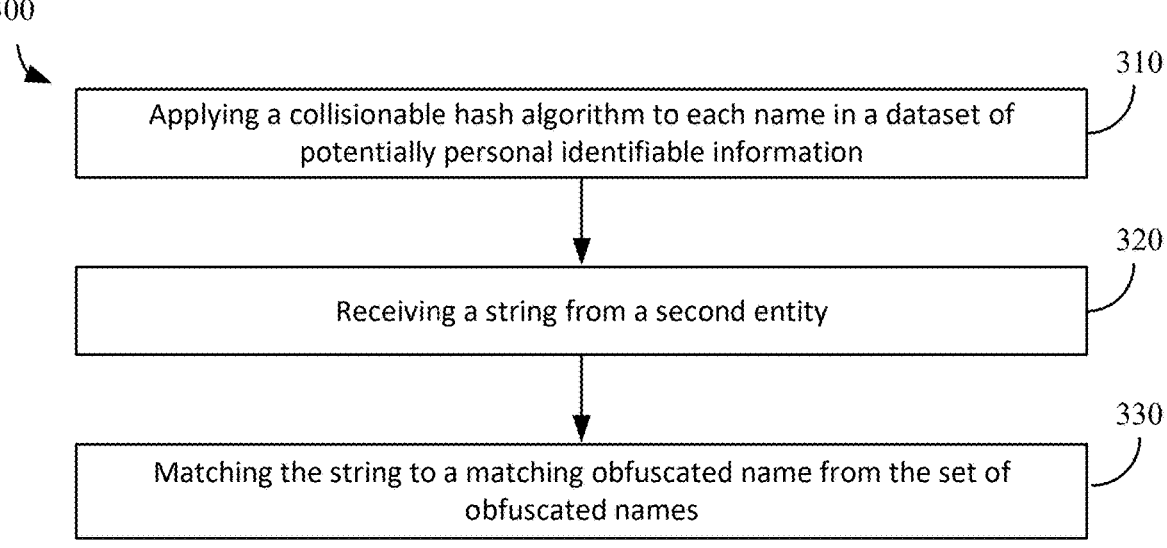
FIG. 3 illustrates a method for obfuscated storage and transmission of PII.

Methods and systems for obfuscated storage and transmission of Personal Identifiable Information (PII) are described. A new hash function is presented that can be used for masking PII data in ways that are useful for fraud analysis. Indeed, the resulting hash can be transferred between parties through an unsecured manner to allow for confirmation of an identification. No decoding or unmasking is necessary.

Advantageously, it is possible to perform the obstruction algorithm of the new hash function without requiring a computing device with conventional hash algorithm capability.

The new hash function is referred to as a collisionable hash algorithm because instead of the conventional approach where hash functions are intended to minimize duplication of output values (i.e., "collision"), the described collisionable hash algorithm intentionally allows for collisions. Indeed, collisions are welcomed as a way to inhibit the reverse-engineering of the output back to the input (i.e., minimize the ability to accurately un-obfuscate the data) since if several inputs result in the same output, reverse-engineering is moot. The described collisionable hash algorithm is fast to run and creates a small output that can be added to the payload of a transaction with minimal overall impact to the payload itself and to the time to generate the output.

Although specific examples provided herein are directed to a chargeback scenario where the PII data to be obfuscated is a name, it should be understood that the described methods and systems are suitable for any scenario where transmission of obfuscated information is desirable and where the receiving party either does not require the original unobfuscated information or had access to the original information at some point in time before obfuscating that original information using the described techniques.

FIG. 1 illustrates a process flow for applying a collisionable hash algorithm. Referring to FIG. 1, a collisionable hash algorithm 100 includes selecting (102) a first group of characters from a string proceeding from left to right; selecting (104) a second group of characters from the string proceeding from right to left; combining (106) the first group of characters and the second group of characters to generate a sequence of characters; and applying (108) a cipher to the sequence of characters to generate an obfuscated string.

For the collisionable hash algorithm, when selecting (102) the first group of characters, the selection can be made by selecting a first number of characters of the string by selecting every other character from left to right. In some cases, a selected first character of the string for the first group of characters is a second-to-left-most character. The first number of characters can be 2 or 3 characters, as examples.

For the collisionable hash algorithm, when selecting (104) the second group of characters, the selection can be made by selecting a second number of characters of the string by selecting every other character from right to left. In some cases, a selected first character of the string for the second group of characters is a second-to-right-most character. Similar to the first number of characters, the second number of characters can be 2 or 3 characters, as examples. The first and second number of characters may be the same number of characters or may be a different number of characters. The total number of characters in the obfuscated string can correlate to a size of the dataset of potentially personal identifiable information. In some cases, the total number of characters in the obfuscated string is 4. In some cases, the total number of characters in the obfuscated string is 6. Of course, more or fewer total number of characters may be used so long as a sufficient number of collisions are expected. In addition, more or fewer total number of characters may be needed depending on the number of characters in a particular alphabet as well as whether the characters are Roman or non-Roman characters.

For the collisionable hash algorithm, when combining (106) the first group of characters and the second group of characters to generate a sequence of characters, the two groups can be concatenated into a single sequence of characters.

The collisionable hash algorithm can use a Ceasar cipher as the cipher applied (108) to the sequence of characters to generate the obfuscated string. The action of a Caesar cipher is to replace each plaintext letter with a different one a fixed number of places down the alphabet. In a specific implementation, the number of places used to shift down the alphabet is the number of characters of the original string. This can be considered a dynamic Ceasar cipher as the number of places to shift the alphabet changes depending on the length of the original string. The shifting can be by default a left shift; however certain implementations may use a right shift. In the example implementation shown in FIG. 2B, a left shift of 3 is used for illustrative purposes.

The collisionable hash algorithm can be used for obfuscated storage and transmission of PII. Accordingly, the string being obfuscated can be, for example, a name. In the illustrated scenarios, the name being obfuscated is of a customer/cardholder.

Advantageously, the described methods allow for a transfer of data between entities in a secure manner by creating n-character strings (e.g., 4-character, 6-character, etc.). These strings can ultimately be used as a tool for a first entity to verify if the data they have on an individual corresponds to the data the second entity has, and vice versa, all without sharing any personal identifiable information data in the process.

FIGS. 2A and 2B illustrate a scenario in which obfuscated storage and transmission of PII is beneficial.

FIG. 2A depicts an illustrative scenario for transmission of PII. Referring to FIG. 2A, a fraudulent transaction 200 may have occurred. A few days after the event, a cardholder 202 (Ron Weasley) realizes the fraud and contacts the issuer 204. The issuer 204 reports the potential fraud 206 to the payment network 208, which in turn informs the merchant 210. The information 212 that is usually sent to the merchant 210 is payment card number, date of purchase, and a transaction amount. Other data elements can sometimes include Acquirer Reference Number (ARN), Authorization Code, Transaction ID. The merchant matches this information to their internal order information and proceed with analysis to determine (215) if they will refund the transaction—and avoid a chargeback—or otherwise dispute the chargeback. For example, when a merchant receives the information regarding the potentially fraudulent charge, the merchant may either 1) decide on what to do with less information; or 2) wait to gather more information from the acquirer, which may cause the merchant to miss the window of opportunity to avoid a chargeback.

Payment networks do not send cardholder name in the payload of the chargeback transaction to the merchant because it is sensitive Personal Identification Information (PII) and its risk in leaking or otherwise abusing. Without the cardholder's name, merchants are missing key information for their analysis and cannot compare it with the name on the account or the delivery address. However, by including a form of the cardholder's name, it will be possible for the merchant to identify the transaction more easily.

This collisionable hash algorithm is an irreversible hash function that incurs a loss of data. A cardholder name is destroyed and what is left is a string that is further modified using, for example, a dynamic Caesar Cipher. This will, of course, lead to collisions, but those are welcomed to further obscure the identity of the cardholder. The string only needs to be unique enough as to not collide often. That is, collisions are welcome, but there should still be some usefulness in receiving the obscured name for the various further purposes. For example, the collisions are made high enough to further anonymity but low enough to be useful to compare if the cardholder's name is equal to the name on the account, name of the person on the delivery address, or on any other database that is relevant to the merchant or other entity receiving the hashed information. Indeed, the use of this data is not to pinpoint a person, but to help point out discrepancies between a received name and the other names available on the entity's databases.

FIG. 2B depicts the illustrative scenario of FIG. 2A where the PII data is able to be transmitted over the unsecure channels so that the merchant can better determine whether to dispute the chargeback. Referring to FIG. 2B, a merchant 220 is able to securely store the PII data of recent transactions by applying (222) the collisionable hash algorithm (CHA) to each name in a dataset 224 of potentially personal identifiable information of customers to generate a set of obfuscated names. For example, in the illustrated scenario, a method for obfuscated storage and transmission of PII carried out at a merchant computing device 225 includes applying the collisionable hash algorithm to each name 226 in a dataset 224 of potentially personal identifiable information of customers to generate a set of obfuscated names. For example, applying the collisionable hash algorithm 100 as described with respect to FIG. 1 to the dataset 224 of potentially personal identifiable information of customers includes selecting a first group 228 of characters from a name 226-A proceeding from left to right; selecting a second group 230 of characters from the name 226-A proceeding from right to left; combining the first group of characters and the second group of characters to generate a sequence of characters 232; and applying (235) a cipher to the sequence of characters to generate an obfuscated name 236 for the set of obfuscated names.

The dataset may contain a single name or many names. In some cases, the dataset 224 includes associated transaction information for each name.

Returning to the fraud scenario described in FIG. 2A, when the cardholder 202 (Ron Weasley) realizes the fraud and contacts the issuer 238. The issuer 238 can report the potential fraud 206 to the payment network and include the obfuscated name of the cardholder by applying (240) the collisionable hash algorithm (CHA) to the cardholder's name (e.g., Ron Weasley) to output a string 242 containing the obfuscated name of the cardholder. The payment network (not shown) informs the merchant 220. The information 244 sent to the merchant 220 can now include the string 242 representing the cardholder's name.

The merchant thus receives the string 242 from the issuer 238 and can identify a matching (250) obfuscated name from the set of obfuscated names 226-X using the string. As shown, the set of obfuscated names 226-X is part of a dataset 224-X including transaction data stored at the merchant device. The merchant 220 can then determine (252) whether to dispute the chargeback (or issue a refund to avoid the chargeback, etc.). Using both the string 242 provided by issuer 238 and the set of obfuscated names 226-X, merchant 220 is able to identify appropriate transaction data without the issuer 238 sending any PII at all.

Although the illustrated scenario shows the issuer applying the collisionable hash algorithm to the cardholder's name, in some cases, the payment network may append the cardholder name to the information sent to the merchant (where such information is available to the payment card network) and therefore would apply the collisionable hash algorithm in order to store information related to the cardholder and send the string with the obfuscated name to the merchant.

FIG. 3 illustrates a method for obfuscated storage and transmission of PII. Referring to FIG. 3, a method 300 for obfuscated storage and transmission of PII includes applying (310) a collisionable hash algorithm to each name in a dataset of potentially personal identifiable information to generate a set of obfuscated names. Applying (310) the collisionable hash algorithm can be performed as described with respect to FIG. 1, which may be implemented such as described with respect to FIG. 4, for example, by selecting a first group of characters from a name proceeding from left to right; selecting a second group of characters from the name proceeding from right to left; combining the first group of characters and the second group of characters to generate a sequence of characters; and applying a cipher to the sequence of characters to generate an obfuscated name for the set of obfuscated names.

The set of obfuscated names can be stored. In some cases, the set of obfuscated names can be sent to another entity (e.g., the second entity mentioned below or a third entity).

Method 300 further includes receiving (320) a string from a second entity; and matching (330) the string to a matching obfuscated name from the set of obfuscated names. Once the matching obfuscated name is identified, various actions may be carried out. For example, in some cases, transaction information associated with the matching obfuscated name can be retrieved. In some cases, a flag can be sent to the second entity indicating a match between at least one obfuscated name and the string.

FIG. 4 is an example implementation of the collisionable hash algorithm. As can be seen, the example implementation of the collisionable hash algorithm involves capturing the first and last 3 alternate characters of a name to make the name into a 6-character string and transforming this new string using the Caesar Cipher method with the length of the cleaned original string as seed to the offset. As a first example, Brian Krebs would output RAKBRN. The cleaned string length is 10, therefore the final string would be BKULBX. As another example, Kevin Mitnick would output EIMCNI. The cleaned string length is 12, therefore the final string would be QUYOZU.

The math behind calculating the probabilities of a hash collision requires the hash function to distribute the hashes evenly across the possible range. This is not the case with names—the names of a certain culture or region will always have a few letters that repeat more while others are left almost without any use.

The following provides some probabilities of collisions when using the described collisionable hash algorithm. A theoretical probability is compared to likelihood of collisions on certain name databases available on the internet. The Small Collisions Probabilities (SCP) was used to compare the theoretical—where the odd of any letter is even—to results obtained using real names from name databases available on the internet. SCP is given as follows.

$$SCP = 1 - e^{\frac{-k(k-1)}{2N}}$$

The SCP gives a probability of getting a collision hashing k numbers given an N total space, where k is the number of values being hashed and N is the total unique numbers available as a result of the hash.

The SCP was tested for 6 digits and for 4 digits for the Albanian Parliament Member database with 2,944 unique names (k).

6 Digits $$N6 = 26^6 = 308,915,776$$

$$SCP_6 = 1 - e^{\frac{-2.944*(2.944-1)}{2*308,915,776}} = 1.39\%$$

4 Digits $$N4 = 26^4 = 456,976$$

$$SCP_4 = 1 - e^{\frac{-2.944*(2.944-1)}{2*456,976}} = 99.99\%$$

As can be seen, given an evenly distributed N, the probability of getting a collision with around 3,000 samples is below 2% for a 6-digit hash and 100% for a 4-digit hash.

In practice many collisions were found, indicating skewed distribution of letters from the dataset analyzed. In particular, for the described dataset, there were 91 collisions for the 6-digit hash, resulting in SCP=3.09%, and 143 collisions for the 4-digit hash, resulting in SCP=4.86%.

As mentioned above, the collisions are welcomed in order to further obscure PII data being sent.

Figure 5:
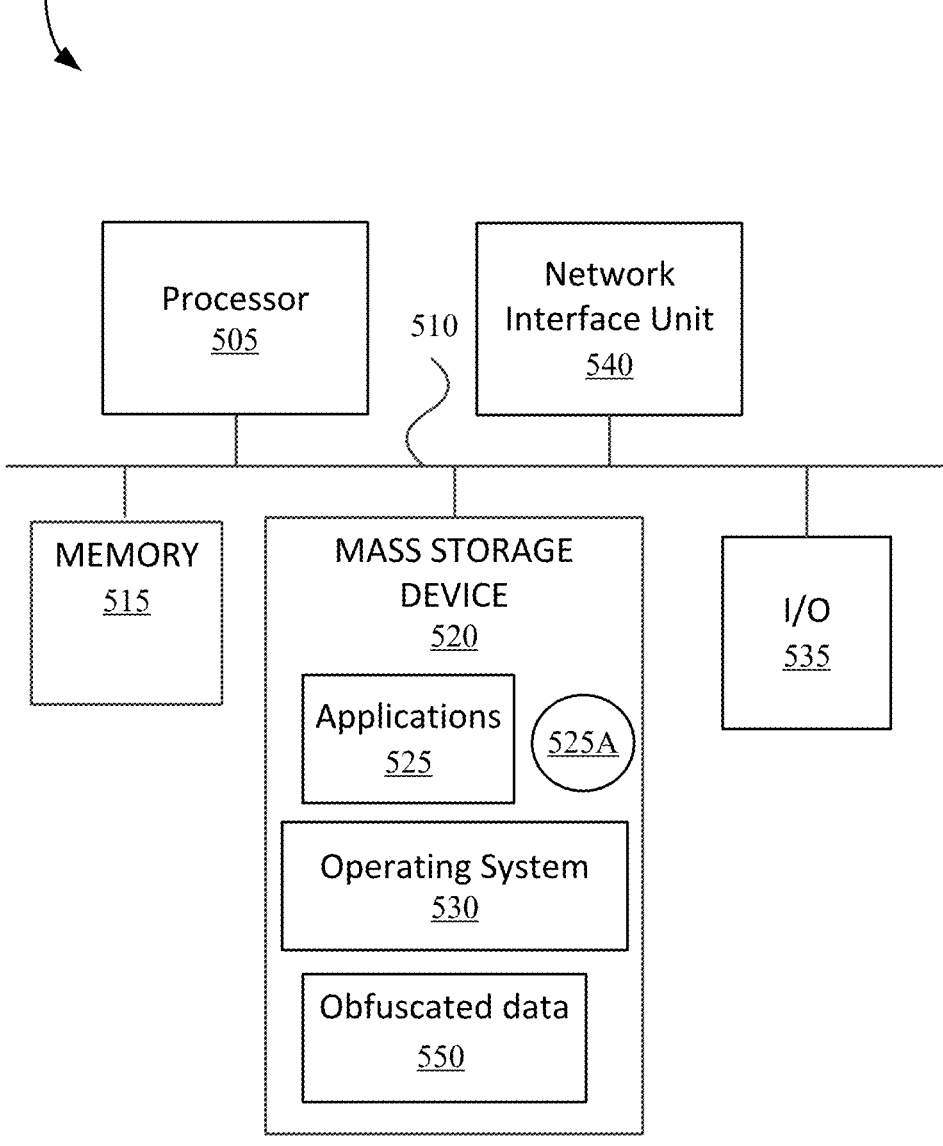
FIG. 5 illustrates a block diagram illustrating components of a computing device used in some embodiments.

FIG. 5 illustrates a block diagram illustrating components of a computing device used in some embodiments. It should be understood that aspects of the system described herein are applicable to both mobile and traditional desktop computers, as well as server computers and other computer systems. Components of computing device 500 may represent a personal computer, a reader, a mobile device, a personal digital assistant, a wearable computer, a smart phone, a tablet, a laptop computer (notebook or netbook), a gaming device or console, an entertainment device, a hybrid computer, a desktop computer, a smart television, an electronic whiteboard or large form-factor touchscreen, or a server, as some examples. Accordingly, more or fewer elements described with respect to computing device 500 may be incorporated to implement a particular computing device.

Referring to FIG. 5, a computing device 500 can include at least one processor 505 connected to components via a system bus 510; a system memory 515 and a mass storage device 520. A processor 505 processes data according to instructions of one or more application programs 525, and/or operating system 530. Examples of processor 505 include general purpose central processing units (CPUs), graphics processing units (GPUs), field programmable gate arrays (FPGAs), application specific processors, and logic devices, as well as any other type of processing device, combinations, or variations thereof. Processor 505 may be, or is included in, a system-on-chip (SoC) along with one or more other components such as sensors (e.g., magnetometer, an ambient light sensor, a proximity sensor, an accelerometer, a gyroscope, a Global Positioning System sensor, temperature sensor, shock sensor) and network connectivity components (e.g., including a network interface unit 540).

The one or more application programs 525 may be loaded into the mass storage device 520 and run on or in association with the operating system 530. Instructions 525A for the collisionable hash algorithm as described herein (e.g., with respect to algorithm 100 and/or described with respect to FIGS. 2B, 3, and 4) can also be stored on the mass storage device 520 and used as a standalone program or used by one or more of the application programs 525 (e.g., either as a built-in function or plug-in). The one or more application programs 525 may include instructions to perform method 300.

Data such as PII data can be stored as obfuscated data 550 (along with other data that may be associated with the obfuscated data) on the mass storage device 520 or may be accessible via the network interface unit 540.

It can be understood that the mass storage device 520 may involve one or more memory components including integrated and removable memory components and that one or more of the memory components can store an operating system. Examples of mass storage device 520 include removable and non-removable storage media including random access memory, read only memory, magnetic disks, optical disks, CDs, DVDs, flash memory, magnetic cassettes, magnetic tape, magnetic disk storage or other magnetic storage devices, or any other suitable storage media. Mass storage device 520 (which may also be referred to as a computer readable storage medium/media) does not consist of propagating signals or carrier waves.

The system memory 515 may include a random-access memory ("RAM") and/or a read-only memory ("ROM"). The RAM generally provides a local storage and/or cache during processor operations and the ROM generally stores the basic routines that help to transfer information between elements within the computer architecture such as during startup.

The system can further include user interface system 535, which may include input/output (I/O) devices and components that enable communication between a user and the computing device 500. User interface system 535 can include one or more input devices such as, but not limited to, a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input.

The user interface system 535 may also include one or more output devices such as, but not limited to, display screen(s), speakers, haptic devices for tactile feedback, and other types of output devices. In certain cases, the input and output devices may be combined in a single device, such as a touchscreen display which both depicts images and receives touch gesture input from the user.

The network interface unit 540 allows the system to communicate with other computing devices, including server computing devices and other client devices, over a network. The network interface unit 540 can include a unit to perform the function of transmitting and receiving radio frequency communications to facilitate wireless connectivity between the system and the "outside world," via a communications carrier or service provider. Transmissions to and from the network interface unit 540 are conducted under control of the operating system 530, which disseminates communications received by the network interface unit 540 to application programs 525 and vice versa.

Certain techniques set forth herein may be described in the general context of computer-executable instructions, such as program modules, executed by one or more computing devices. Generally, program modules include routines, programs, objects, components, and data structures that perform particular tasks or implement particular abstract data types.

Embodiments may be implemented as a computer process, a computing system, or as an article of manufacture, such as a computer program product or computer-readable medium. Certain methods and processes described herein can be embodied as code and/or data, which may be stored on one or more computer-readable media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

It should be understood that as used herein, in no case do the terms "storage media," "computer-readable storage media" or "computer-readable storage medium" consist of transitory carrier waves or propagating signals. Instead, "storage" media refers to non-transitory media.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method for obfuscated storage and transmission of Personal Identifiable Information (PII) comprising:

applying a collisionable hash algorithm to each name in a dataset of potentially personal identifiable information to generate a set of obfuscated names, wherein applying the collisionable hash algorithm comprises:

selecting a first group of characters from a name proceeding from left to right;

selecting a second group of characters from the name proceeding from right to left;

concatenating the first group of characters and the second group of characters to generate a sequence of characters; and applying a cipher to the sequence of characters to generate an obfuscated name for the set of obfuscated names;

storing, at a mass storage device, the set of obfuscated names;

receiving a string from a second entity, wherein the string contains an obfuscated name generated by applying the collisionable hash algorithm to a specific name corresponding to one of the names in the dataset; and matching the received string to a matching obfuscated name from the set of obfuscated names stored at the mass storage device.

2. The method of claim 1, wherein selecting the first group of characters from the name proceeding from left to right comprises selecting a first number of characters of the name by selecting every other character from left to right.

3. The method of claim 2, wherein a selected first character of the name for the first group of characters is a second-to-left-most character.

4. The method of claim 1, wherein selecting the second group of characters from the name proceeding from right to left comprises selecting a second number of characters of the name by selecting every other character from right to left.

5. The method of claim 4, wherein a selected first character of the name for the second group of characters is a second-to-right-most character.

6. The method of claim 1, wherein concatenating the first group of characters and the second group of characters to generate a sequence of characters comprises concatenating the first group of characters and the second group of characters.

7. The method of claim 1, wherein the obfuscated name comprises 4 total characters.

8. The method of claim 1, wherein the obfuscated name comprises 6 total characters.

9. The method of claim 1, wherein a total number of characters in the obfuscated name correlates to a size of the dataset of potentially personal identifiable information.

10. The method of claim 1, wherein the string received from the second entity is generated using the collisionable hash algorithm.

11. The method of claim 1, further comprising retrieving transaction information associated with the matching obfuscated name.

12. The method of claim 11, wherein the transaction information associated with the matching obfuscated name includes a payment card number, a date of purchase, and a transaction amount.

13. The method of claim 1, further comprising sending the set of obfuscated names to the second entity or a third entity.

14. The method of claim 1, further comprising sending a flag to the second entity indicating a match between at least one obfuscated name and the string.

15. A computer-readable storage medium having instructions stored thereon that when executed by a computing device direct the computing device to:

apply a collisionable hash algorithm to a name, wherein instructions to apply the collisionable hash algorithm include directing the computing device to:

select a first group of characters from the name proceeding from left to right;

select a second group of characters from the name proceeding from right to left;

concatenate the first group of characters and the second group of characters to generate a sequence of characters; and apply a cipher to the sequence of characters to generate an obfuscated name for the name; and store, at a mass storage device, the obfuscated name.

16. The computer-readable storage medium of claim 15, wherein the collisionable hash algorithm is applied to each name in a dataset of potentially personal identifiable information including names to generate a set of obfuscated names for the names in the dataset, the instructions further direct the computing device to:

receive a string from a second entity, wherein the string contains an obfuscated name generated by applying the collisionable hash algorithm to a specific name corresponding to one of the names in the dataset; and match the received string to a matching obfuscated name from the set of obfuscated names stored at the mass storage device.

17. The computer-readable storage medium of claim 16, wherein the string received from the second entity is generated using the collisionable hash algorithm.

18. The computer-readable storage medium of claim 15, wherein the instructions to select the first group of characters from the name proceeding from left to right direct the computing device to select a first number of characters of the name by selecting every other character from left to right, wherein a selected first character of the name for the first group of characters is a second-to-left-most character.

19. The computer-readable storage medium of claim 15, wherein the instructions to select the second group of characters from the name proceeding from right to left direct the computing device to select a second number of characters of the name by selecting every other character from right to left, wherein a selected first character of the name for the second group of characters is a second-to-right-most character.

20. The computer-readable storage medium of claim 15, wherein the instructions to concatenate the first group of characters and the second group of characters to generate a sequence of characters direct the computing device to concatenate the first group of characters and the second group of characters.

* * * * *